Feb. 14, 1928.
H. F. CARPENTER
1,658,881
DISTRIBUTOR FOR MOTOR VEHICLE HEATERS
Filed Jan. 6, 1927
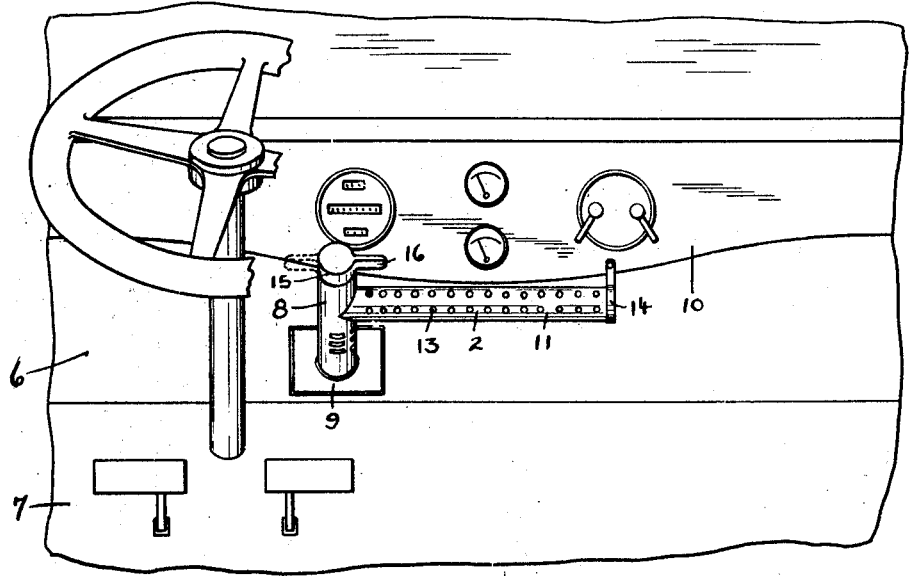
Fig. 1
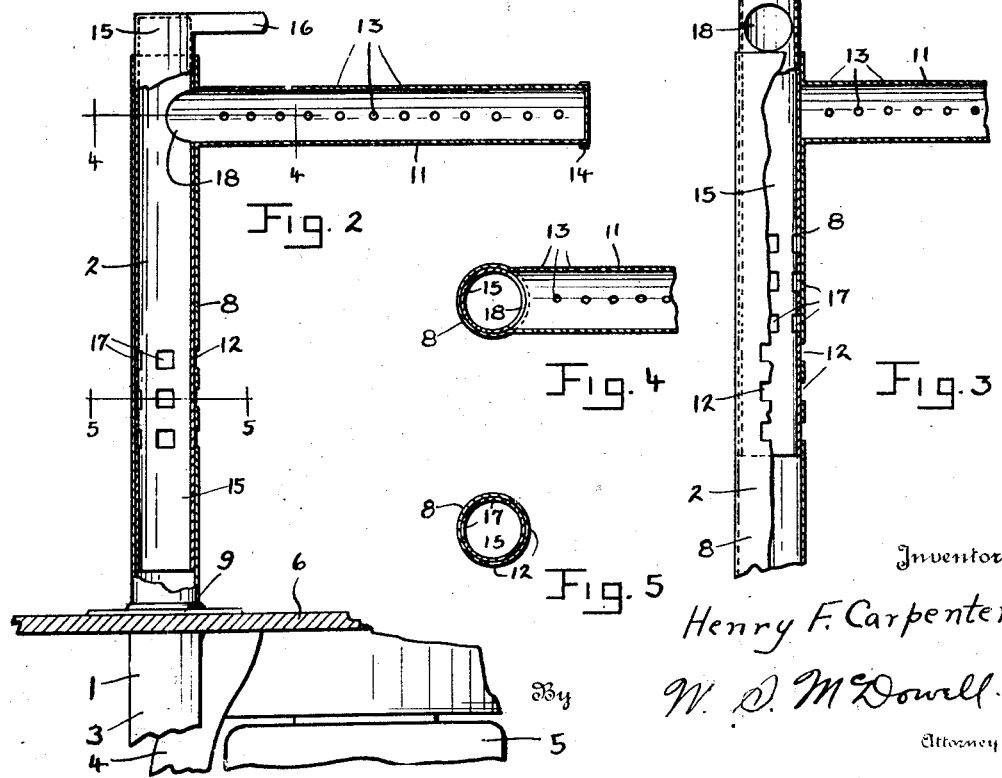
Inventor
Henry F. Carpenter.
By W. D. McDowell.
Attorney Patented Feb. 14, 1928.

1,658,881

UNITED STATES PATENT OFFICE.

HENRY F. CARPENTER, OF BASIL, OHIO.

DISTRIBUTOR FOR MOTOR-VEHICLE HEATERS.

Application filed January 6, 1927. Serial No. 159,489.

This invention relates to an improved distributor for motor vehicle heaters, and the primary object of the invention resides in the provision of a novel and improved distributor adapted for use in connection with motor vehicle heaters of the type which are adapted to surround the exhaust manifold of an internal combustion engine and which are open to the atmosphere at the front end thereof and have the rear portions thereof terminated in communication with the interior of the vehicle body, and which operate by circulating air across the heated surfaces of the exhaust manifold and leading this heated air into the vehicle body for the comfort and convenience of the occupants.

Most heaters of this type enter the vehicle body through the floor board construction at the seat of the driver in a plane substantially horizontal to that of the exhaust manifold. Practice has determined that this customary construction does not provide for the most efficient circulation of the heated air, nor is the heat distributed effectively within the vehicle body to uniformly heat the latter throughout all portions thereof in an effective and expeditious manner. It is therefore an object of the present invention to provide a distributor which comprises an upwardly inclined conduit leading from a point near the floor board of the vehicle, and communicating with the discharge end of the heater, and extending upwardly to a branch conduit, arranged substantially at right angles to the main inclined conduit and disposed in a horizontal plane immediately adjacent to and parallel with the instrument panel of the vehicle. By this construction the draught or heat circulation of the heated air is increased in velocity, and a greater volume of heated air delivered to the interior of the car, at the same time the heat is released at a more advantageous position so that its effect may be more quickly appreciated by the vehicle occupants and the body of the car maintained in a warmer and more comfortable condition.

A further object of the invention resides in providing the lower inclined conduit and the upper horizontal conduit with valve regulated ports which may be selectively opened and closed to control the heat flow from the distributor.

Another object of the invention resides in the provision of a distributor of simple yet efficient construction which can be readily applied in an operating position within the vehicle, and which when actively positioned, will be out of the way and will not interfere with the space allotted to the passengers of the vehicle.

With these and other objects in view, as will appear as the description proceeds, the invention consists in the novel features of construction, combinations of elements and arrangements of parts hereinafter to be fully described and pointed out in the appended claims.

In the accompanying drawing:

Figure 1 is a perspective view of the heat distributor comprising the present invention, showing the operating position thereof within a motor vehicle, Figure 2 is a horizontal sectional view taken through the distributor and the associated manifold heater, Figure 3 is a horizontal transverse sectional view taken through the upper conduit and associated part, Figure 4 is a sectional view on the line 4—4 of Figure 2, Figure 5 is a sectional view on the line 5—5 of Figure 2.

Referring more particularly to the drawing the numeral 1 designates any standard type of manifold heater employed for motor vehicle heating purposes, and the numeral 2 designates the distributor comprising the present invention in its entirety. The manifold heater may comprise the usual sheet metal casing 3, which is applied to the exhaust manifold 4 of an internal combustion motor 5. The manifold is open at its front end and at its rear end enters the floor or dash board construction 6 of the motor vehicle 7. In heaters of this type air is admitted in the open front end and is then circulated along the heated surfaces of the exhaust manifold, whereby a heat exchange is effected so as to raise the temperature of the air and make the same adaptable for heating the passenger zone of the vehicle.

In order to more efficiently utilize the heat thus developed the distributor 2 is combined therewith and arranged with the interior of the vehicle. In the present instance the distributor is formed to include a main conduit 8 which is inclined with respect to the horizontal and has its lower end connected as at 9 with the discharge end of the casing 3, the conduit extending obliquely upwardly from its point of connection with said heater to a position immediately adjacent to the lower edge of the instrument panel 10 of the motor vehicle.

Connected with the upper end of the main conduit 8 is a supplemental conduit or head 11, which in this instance extends at right angles to the axis of the main conduit 8 and is adapted to occupy a substantially horizontal plane, being disposed adjacent to and in parallel relation with the lower edge of the panel 10. The main conduit 8 at a point intermediate of its length is provided with a plurality of spaced ports 12, and the supplemental conduit is also provided with a plurality of relatively smaller ports or outlets 13, extending throughout the length thereof. Any suitable means may be provided for retaining the distributor in the operating positions shown, and in this instance the upper portion of the distributor is secured to the instrument board or panel by means of securing straps 14.

Positioned within the conduit 8 and rotatably and longitudinally movable therein is a tubular valve member 14, which is formed to extend through the open upper end of the conduit 8 and is provided with a manipulating handle 16. In this instance the valve 15 is provided with a plurality of ports 17 at the lower end thereof, which upon rotation of the valve member may be brought into and out of registration with the ports 12, in order to allow the heat to flow from the ports and into more direct contact with the limbs of the occupants, permitting the heat of the device to be concentrated on the feet of the vehicle operator, or other occupants, particularly when the vehicle is being initially operated. Also formed in the upper end of the valve member 15 is an opening 18, which is so positioned that when the ports 12 and 17 are out of registration, the opening 18 will be aligned with the supplemental conduit 11, allowing the heat to flow upwardly through the entire length substantially of the main conduit 8, and to then enter the angularly disposed supplemental conduit 11, where the heat is permitted to issue from the ports or outlets 13 into a relatively elevated part in the car. The elevated outlet has the advantage of producing a better circulation of the heat throughout the interior of the vehicle body, by improving the circulation of air through the heater 1 and also in providing for a more effective release of the heat within the vehicle than when the customary form of foot board opening is provided. It will be understood that the parts of the distributor may be formed from sheet metal or the like, and attractively finished to present a neat and workmanlike appearance. Essentially the distributor is out of the way, since the main conduit 8 is located beneath the cowl or dash construction of the vehicle, while the supplemental conduit extends horizontally adjacent to the lower edge of the instrument panel.

By the provision of the construction described a distributor is provided which within a short period of operation is adapted to warm the feet and legs by permitting the heat to issue from the ports 12 and 17 directly into the lower part of the car. After this initial operation the valve member is turned so as to close these ports and to permit heat to issue from the elongated supplemental conduit 11 in the form of a spray, and which is distributed horizontally and uniformly throughout the vehicle body. The heat which issues from the main conduit, together with the heat that goes under the dash construction from the supplemental conduit, keeps the feet and legs of the drivers or vehicle occupants warm and comfortable. The supplemental conduit distributes the heat in the center of the car from the floor up and produces a uniform temperature within the interior of the car hitherto unobtainable by the floor type of registers. Again, to keep the vehicle warm when parked it is merely necessary to pull the valve member 15 outwardly a slight distance until the opening 18 therein projects outwardly in advance of the upper end of the main conduit 8. This places a strong draught on the exhaust manifold which serves to keep the car warm until the exhaust manifold becomes cool. This heat circulation will continue as long as there is any warmth remaining in the exhaust manifold, keeping the car in a heated condition for a very considerable period of time, following the stopping of the engine. This is a feature of very considerable importance where the driver is obliged to make frequent stops or short calls. The device has the advantage of being easy to install and may be conveniently operated from the instrument panel of the vehicle.

What is claimed is:

1. A heat distributor for motor vehicles comprising a heat conveying conduit arranged beneath the cowl construction of a motor vehicle and extending from the dash board construction of said vehicle upwardly to a point contiguous to the instrument panel, the lower end of said conduit being in communication with the discharge end of a manifold heater, said conduit being provided with a plurality of ports, a distributing head provided at the upper end of said conduit, and a valve member mounted in said conduit for selectively opening and closing said ports and said distributing head.

2. A heat distributor for motor vehicle heaters consisting of a heat conveying conduit adapted to be mounted within a motor vehicle and having its lower end formed for communication with the discharge end of a manifold heater, a laterally directed distributing head formed with the upper end of said conduit, and a valve member rotatably and slidably mounted in the upper end of said conduit and provided with an opening adapted upon rotation to bring said head into and out of communication with said conduit, the sliding of said valve member permitting said opening to be brought into direct communication with the atmosphere for discharging the heat directly from the upper end of said conduit and without entering said head.

In testimony whereof I affix my signature.

HENRY F. CARPENTER.